(12) United States Patent
Jeong et al.

(10) Patent No.: US 7,843,359 B2
(45) Date of Patent: Nov. 30, 2010

(54) FAULT MANAGEMENT SYSTEM USING SATELLITE TELEMETERING TECHNOLOGY AND METHOD THEREOF

(75) Inventors: Cheol-Oh Jeong, Gyeonggi-do (KR); Yong-Deuk Lee, Daejon (KR); Jae-Woo Park, Daejon (KR); Seong-Pal Lee, Daejon (KR)

(73) Assignee: Electronics and Telecommunications Research Institue, Daejon (KR)

( * ) Notice: Subject to any disclaimer, the term of this patent is extended or adjusted under 35 U.S.C. 154(b) by 1033 days.

(21) Appl. No.: 11/607,039

(22) Filed: Dec. 1, 2006

(65) Prior Publication Data

US 2007/0129009 A1    Jun. 7, 2007

(30) Foreign Application Priority Data

Dec. 1, 2005   (KR) ............... 10-2005-0116155
Aug. 30, 2006  (KR) ............... 10-2006-0083137

(51) Int. Cl.
  *G08C 19/16* (2006.01)
(52) U.S. Cl. .................. 340/870.01; 340/870.07; 701/29; 701/35
(58) Field of Classification Search ............ 340/870.07, 340/870.01; 701/29–35
  See application file for complete search history.

(56) References Cited

U.S. PATENT DOCUMENTS

| | | | | |
|---|---|---|---|---|
| 4,989,146 | A * | 1/1991 | Imajo ................ | 701/35 |
| 5,400,018 | A * | 3/1995 | Scholl et al. .......... | 340/10.3 |
| 5,442,553 | A * | 8/1995 | Parrillo ............... | 455/420 |
| 5,845,230 | A * | 12/1998 | Lamberson ............ | 702/56 |
| 6,278,377 | B1 * | 8/2001 | DeLine et al. .......... | 340/815.4 |
| 6,330,497 | B1 * | 12/2001 | Obradovich et al. ..... | 701/1 |
| 6,513,368 | B2 * | 2/2003 | Bondarowicz et al. ... | 73/53.05 |
| 6,580,983 | B2 * | 6/2003 | Laguer-Diaz et al. .... | 701/35 |

(Continued)

FOREIGN PATENT DOCUMENTS

JP    2002-352360    12/2002

(Continued)

OTHER PUBLICATIONS

Notice of Allowance for Korean Application 10-2006-0083137.

(Continued)

*Primary Examiner*—Albert K Wong
(74) *Attorney, Agent, or Firm*—Lowe Hauptman Ham & Berner LLP

(57) ABSTRACT

A fault management system using a satellite telemetering technology and a method thereof are provided. The fault management system includes: a telemetering sensing unit for collecting telemetering data from target apparatuses, which are installed at a remote location and an unattended location and managed through a satellite, in real time and sensing whether the target apparatuses are malfunctioned or not based on the collected telemetering data; a controlling unit for determining whether the target apparatuses are malfunctioned or not by comparing the telemetering data with unique performance request values for normally driving the target apparatuses, analyzing causes of malfunctions, and storing malfunction data into a malfunction data storing unit; a malfunction data analysis unit for managing the malfunction data stored in the malfunction data storing unit and analyzing the malfunction data; and a display unit for outputting the result of analyzing the malfunction data on a display device.

10 Claims, 5 Drawing Sheets

U.S. PATENT DOCUMENTS

| | | | |
|---|---|---|---|
| 6,594,579 B1 * | 7/2003 | Lowrey et al. | 701/123 |
| 6,611,740 B2 * | 8/2003 | Lowrey et al. | 701/29 |
| 6,732,031 B1 * | 5/2004 | Lightner et al. | 701/33 |
| 6,850,823 B2 * | 2/2005 | Eun et al. | 701/29 |
| 6,957,133 B1 * | 10/2005 | Hunt et al. | 701/29 |
| 6,965,320 B1 * | 11/2005 | Casey et al. | 340/870.07 |
| 7,010,289 B2 * | 3/2006 | Jijina et al. | 455/412.1 |
| 7,123,164 B2 * | 10/2006 | Zoladek et al. | 340/870.07 |
| 7,184,866 B2 * | 2/2007 | Squires et al. | 701/33 |
| 7,460,871 B2 * | 12/2008 | Humphries et al. | 455/456.1 |
| 7,647,202 B2 * | 1/2010 | Lamontagne | 702/182 |
| 2001/0005821 A1 * | 6/2001 | Ottosson | 702/185 |
| 2003/0107548 A1 * | 6/2003 | Eun et al. | 345/156 |
| 2006/0095232 A1 * | 5/2006 | Purdy | 702/185 |

FOREIGN PATENT DOCUMENTS

| | | |
|---|---|---|
| KR | 1020030014325 | 2/2003 |
| KR | 1020030017842 | 3/2003 |
| KR | 1020030047179 | 6/2003 |
| KR | 1020030087681 | 11/2003 |
| KR | 1020040107895 | 12/2004 |
| KR | 1020050074452 | 7/2005 |
| KR | 1020050110815 | 11/2005 |
| WO | 02/090669 | 11/2002 |

OTHER PUBLICATIONS

International Office Action for Korean Application 10-2006-0083137.

Huber Weisser et al.; "Autonomous Driving on Vehicle Test Tracks: Overview, Implementation and Vehicle Diagnosis"; 0-7803-4975-X. 98$10.00© 1999 IEEE; pp. 62-67.

Sarma R. Vishnubhotla et al.; "A Centralized Multiprocessor- based Control to Optimize Performance in Vehicles"; TG0231/88/0000-0052 $1.00© 1988 IEEE; pp. 52-56.

* cited by examiner

FIG. 4

STATE DISPLAY WINDOW  /—141

- LOCATION OF APPARATUS : APPARATUS ID
- APPARATUS STATE :
  PERFORMANCE DEGRADATION / MALFUNCTION
- MALFUNCTIONING OR NOT:
  OVERALL MALFUNCTION / PARTIAL MALFUNCTION
- DETAIL OF MALFUNCTION:
  PART #2  PERFORMANCE REDUCED/ MALFUNCTION
  NOT RECEIVING SIGNAL FROM INPUT END
- CURRENT CONDITION:
  REPLACE MALFUNCTIONING PART / OVERALL MALFUNCTION

RESULT DISPLAY WINDOW  /—142

- NAME OF APPARATUS :
  - RESULT OF BASIC STATISTIC ANALYSIS :
    -
  - RESULT OF RAW ANALYSIS :
    - MTBF :
    - Reliability :
    - Maintainability :

- NAME OF PART :
  - RESULT OF BASIC STATISTIC ANALYSIS :
    -
  - RESULT OF RAW ANALYSIS :
    - MTBF :
    - Reliability :
    - Maintainability :
    - ESTIMATE AMOUNT OF PARTS :
  - CURRENT AMOUNT OF PARTS :

FAULT MANAGEMENT SYSTEM USING SATELLITE TELEMETERING TECHNOLOGY AND METHOD THEREOF

FIELD OF THE INVENTION

The present invention relates to a fault management system using a satellite telemetering technology and a method thereof; and, more particularly, to a fault management system using satellite telemetering technology for effectively managing resources and man power for repairing the malfunction of the apparatus by reporting current performance state and malfunction state of an apparatus installed at a remote location or an unattended location to a management center in real time using the telemetering technology, storing data about the malfunction state of the apparatus in a database, and analyzing the malfunction data stored in the database, and a method thereof.

DESCRIPTION OF RELATED ARTS

Conventionally, an apparatus is controlled, and the performance or the malfunction thereof are diagnosed by embedded elements/parts or circuits. When the apparatus is malfunctioned, related malfunction data is transmitted to a management center through a wired or a wireless network. A corresponding manager determines whether the apparatus is malfunctioned or not based on the malfunction data. Then, the manager or a related person travels to the location of the apparatus to detect causes of malfunction, and fixes the apparatus at the location thereof. The conventional method requires the manager to detect the causes of the malfunction of the apparatus at the actual spot of the apparatus. Accordingly, the manager must travel to the location of the apparatus with related material, accessories, and parts, thereby wasting numerous resources and long time to repair the apparatus.

Therefore, there is a demand for developing a fault management system and method for effectively managing and repairing the malfunction of an apparatus.

SUMMARY OF THE INVENTION

It is, therefore, an object of the present invention to provide a fault management system using satellite telemetering technology for effectively managing resources and man power for repairing the malfunctioning apparatus by reporting current performance state and malfunction state of an apparatus installed at a remote location or an unattended location to a management center in real time using the telemetering technology, storing data about the malfunction state of the apparatus in a database, and analyzing the malfunction data stored in the database, and a method thereof.

In accordance with an aspect of the present invention, there is provided a fault management system using a satellite telemetering technology including: a telemetering sensing unit for collecting telemetering data from target apparatuses, which are installed at a remote location and an unattended location and managed through a satellite, in real time and sensing whether the target apparatuses are malfunctioned or not based on the collected telemetering data; a controlling unit for determining whether the target apparatuses are malfunctioned or not by comparing the telemetering data with unique performance request values for normally driving the target apparatuses, analyzing causes of malfunctions, and storing malfunction data into a malfunction data storing unit; a malfunction data analysis unit for managing the malfunction data stored in the malfunction data storing unit and analyzing the malfunction data; and a display unit for outputting the result of analyzing the malfunction data on a display device.

In accordance with an aspect of the present invention, there is also provided a fault management method using satellite telemetering technology including the steps of: collecting telemetering data from target apparatuses, which are installed at a remote location and an unattended location and managed through a satellite, in real time, and sensing whether the target apparatuses are malfunctioned or not based on the collected telemetering data; determining whether the target apparatuses are malfunctioned or not by comparing the telemetering data with unique performance request values for normally driving the target apparatuses, analyzing causes of malfunctions, and storing malfunction data into a database; managing the malfunction data stored in the malfunction data storing unit and analyzing the malfunction data; and outputting the result of performing statistical malfunction analysis on the malfunction data stored in the database.

BRIEF DESCRIPTION OF THE DRAWINGS

The above and other objects and features of the present invention will become better understood with regard to the following description of the preferred embodiments given in conjunction with the accompanying drawings, in which:

FIG. 4 is a diagram illustrating a display device of a fault management system in accordance with an embodiment of the present invention.

DETAILED DESCRIPTION OF THE INVENTION

Hereinafter, a fault management system using satellite telemetering technology and a method thereof will be described in more detail with reference to the accompanying drawings.

Figure 1:
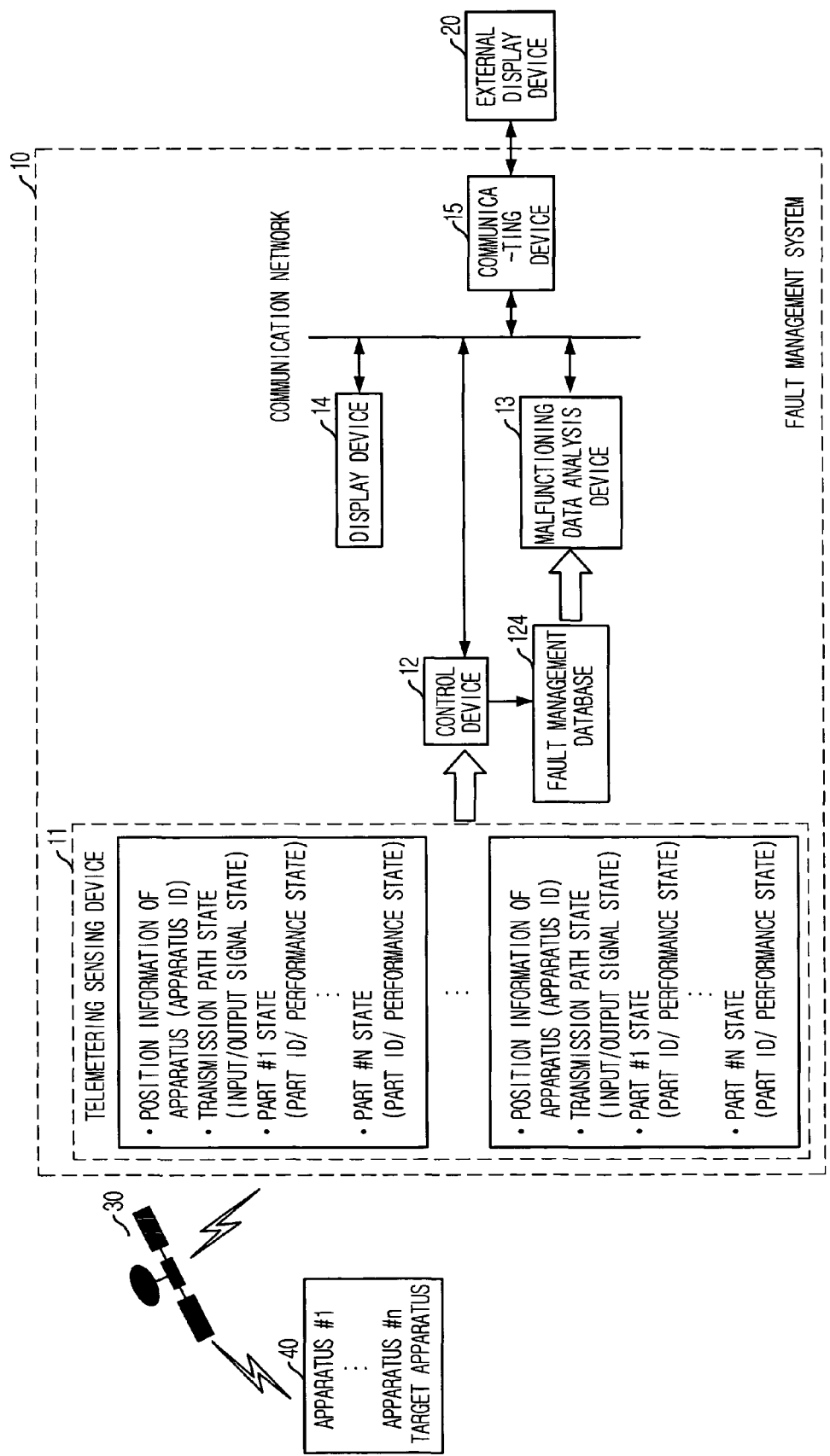
FIG. 1 is a block diagram illustrating a fault management system using satellite telemetering technology in accordance with an embodiment of the present invention.

FIG. 1 is a block diagram illustrating a fault management system using satellite telemetering technology in accordance with an embodiment of the present invention.

Referring to FIG. 1, the fault management system according to the present embodiment 10 includes target apparatuses 40, a telemetering sensing device 11, a control device 12, a malfunction data analysis device 13, and a communicating device 15. The target apparatuses 40 are installed at a remote location or an unattended location and managed through a satellite 30. The telemetering sensing device 11 senses whether the target apparatuses are malfunctioned or not based on telemetering data transmitted from the target apparatuses 40 in real time. The control device 12 determines whether the target apparatuses 40 are malfunctioned or not based on the telemetering data transferred from the telemetering sensing device 11. The malfunction data analysis device 13 manages and analyzes malfunction data stored in a fault management database 124 of the control device. The communicating device 15 performs a function for communicating with external display device 20.

The telemetering data includes the position information of each target apparatus 40. The telemetering data also includes information on the identification numbers of each part/accessory, the performance state and the malfunction state of each part/accessory, and the state of transmission path to the target apparatuses 40. However, the present invention is not limited thereby.

The fault management system 10 provides information about the performance state and the transmission path state of the target apparatuses 40 and a result of analyzing malfunction data to service centers such as a management center including a central management center and a local management center, a local service center, and a repair center. In order to provide such information to the service centers in real time or in response to an additional request, the fault management system 10 is connected to a computer having a communicating function or display devices, such as a display device 14 and an external display device 12, of all equipment that requires information about analyzing the malfunction of the target apparatus 40.

Hereinafter, the functions of constitutional elements of a fault management system 10 in accordance with an embodiment of the present invention will be described.

The telemetering sensing device 11 of the fault management system 10 collects the position information of the target apparatuses 40, the operation state of parts/accessories thereof, and the state of the transmission paths to the target apparatuses 40, which are transmitted from the target apparatuses 40 installed at a remote location or an unattended location to a satellite 30 in real time through the antennas of the target apparatuses 40. Then, the telemetering sensing device 11 determines whether the performance of the target apparatuses 40 is normal or not based on the collected information, and performs bidirectional or interactive communication through the satellite 30 in response to a request of a manager in order to check whether the performance of a predetermined target apparatuses is normal or not in real time.

The control device 12 receives telemetering data from the telemetering sensing device 11, and analyzes the received telemetering data by comparing the telemetering data with unique performance request values which must be sustained to normally drive the apparatuses 40. If the comparing and analyzing result shows that the performance level of the target apparatuses 40 is below than a predetermined level, the control device 12 determines that the apparatus 40 is in an abnormal state denoting a malfunction state. That is, if the control device 12 diagnoses the apparatus 40 as the abnormal state, that is, the malfunction state, the control device 12 determines whether it is overall malfunction or partial malfunction of the apparatus 40. After determination, the control device 2 displays the result of the determination on the display device 14 through a communication network, or transmits the result of the determination to an external display device 20 of a customer. At the same time, the control device 12 transforms the information about the malfunction state of the corresponding apparatus 40 to malfunction data, and stores the telemetering data and the malfunction data into the fault management database 124.

As described above, the control device 12 displays the normal/abnormal state of the target apparatuses 40 and the information about malfunctioning parts thereof. Also, the control device 12 builds the fault management database using real time malfunction information that is required to define a knowledge bases maintenance policy through analyzing the malfunction information.

The malfunction data analysis device 13 calculates the reliability level of equipment or parts/accessories required for defining the knowledge bases maintenance policy of the target apparatuses 40, a result of repairing the target apparatuses 40 using a manager, and a result of analyzing the malfunction such as a proper amount of parts/accessories for repairing by analyzing the stored malfunction data in the fault management database 124 of the control device 12 using a statistical scheme or a reliability, availability, maintainability and susceptibility (RAMS) diagnosis. The malfunction data analysis device 13 displays the calculated malfunction data analysis result on a display device 14 or transfers the calculated malfunction data analysis result to an external display device 20 of a customer.

The control device 12 and the malfunction data analysis device 13 outputs the current malfunctioning condition, position information, malfunctioning parts, the current repairing condition, and a result of analyzing malfunction of the target apparatuses 40 to the display device through a communication network or outputs to the outside display device 20, thereby informing the service center such as a management center including a central management center or a local management center, a local service center, and a repairing center with the information of the target apparatuses 40.

Figure 2:
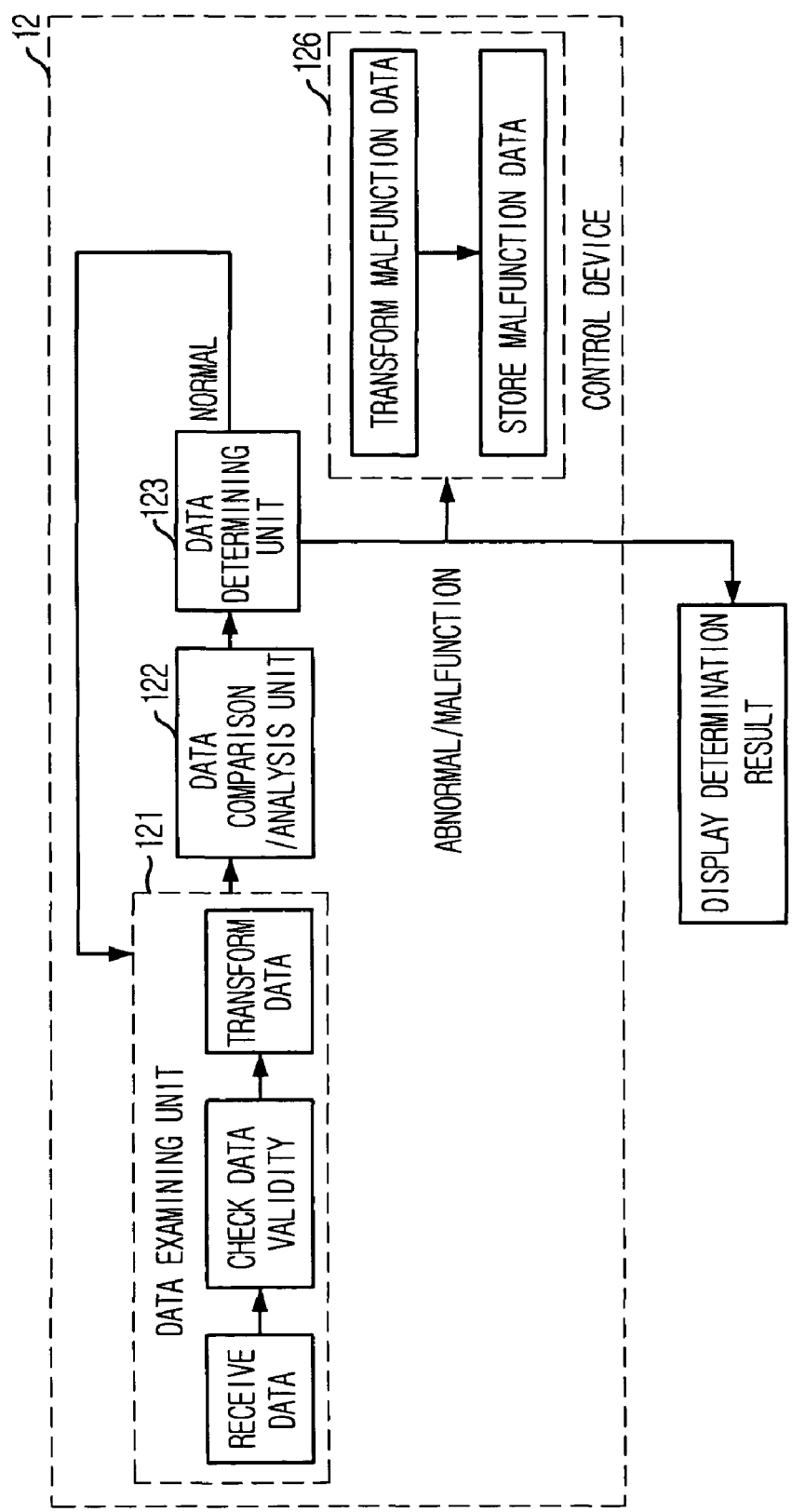
FIG. 2 is a diagram illustrating a control device of a fault management system in accordance with an embodiment of the present invention.

FIG. 2 is a diagram illustrating a control device of a fault management system in accordance with an embodiment of the present invention.

As shown in FIG. 2, the control device 12 of the fault management system 10 includes a data examining unit 121, a data comparison/analysis unit 122, a data determining unit 123, and a fault management database 124. The data examining unit 121 examines the validity of telemetering data received to analyze the performance of the target apparatus 40 from the telemetering sensing device 11 in real time, and transforms the received telemetering data to data format that denotes the performance state of the target apparatuses 40. The data comparison/analysis unit 122 compares the transformed performance state data of the target apparatuses 40 from the data examining unit 121 with previously stored unique performance request values of each block, part and accessory of each target apparatus 40. The data determining unit 123 determines whether each target apparatus 40 is in a normal state or an abnormal state that is a malfunction state based on the comparing/analyzing result, or determines whether the performance of each part/accessory is in a normal state or an abnormal state. After determination, the data determining unit 123 transmits information about the overall malfunction or the partial malfunction of the target apparatuses 40 including the position information thereof to the display device 14 through a communication network or to the external display device 20 through the communicating device 15. The fault management database 124 transforms the malfunction state information determined by the data determining unit 123 and telemetering data from the telemetering sensing device 11 to the malfunction data format, and stores the transformed malfunction data.

The control device 12 is an on-board computer having a multiprocessor. Therefore, it allows multiprocessing the telemetering data from the telemetering sensing device 11, and it can dynamically manage and process the telemetering data according to the functional expansion of the target apparatus such as adding or modifying the functions thereof.

Also, the control device 12 allows a service center or a customer to search the current malfunction condition and malfunction analysis materials of a corresponding apparatus 40 through accessing the fault management database 124 when the control device 12 receives a request of a performance and a malfunctioning history of a predetermined target apparatus 40 installed at a predetermined location from a service center or a customer. Herein, the service center may include a management center such as a central management center or a local management center, a local service center and a repairing center. Then, the control device 12 outputs the related materials to the display device 14 or the external display device 20.

Figure 3:
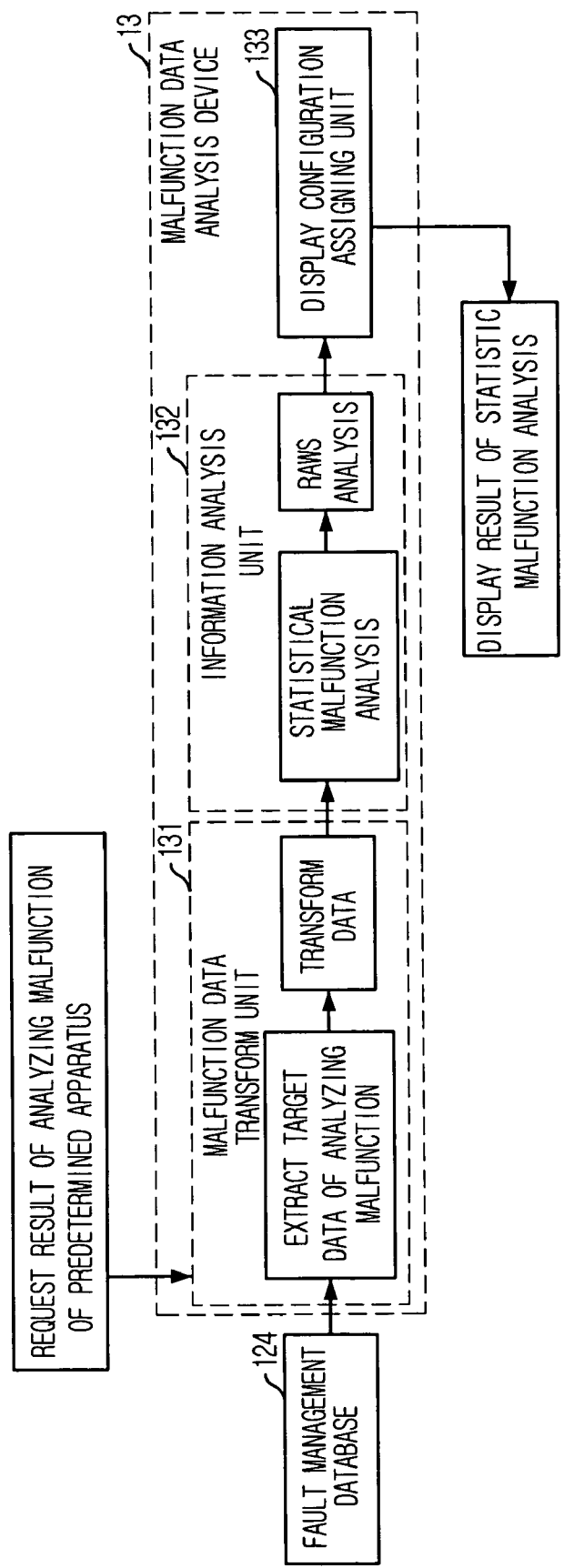
FIG. 3 is a block diagram illustrating a malfunction data analysis device of a fault management system in accordance with an embodiment of the present invention.

FIG. 3 is a block diagram illustrating a malfunction data analysis device of a fault management system in accordance with an embodiment of the present invention.

Referring to FIG. 3, the malfunction data analysis device 13 includes a malfunction data transform unit 131, an information analysis unit 132, and a display configuration assigning unit 133.

The malfunction data transform unit 131 transforms the malfunction data stored in the malfunction data management database 124 of the control device into data format that can be used as input data of a statistical malfunction analysis tool or a RAMS analysis tool. The information analysis unit 132 analyzes the transformed data from the malfunction data transform unit 131 through the statistical malfunction analysis tool or the RAMS analysis tool. That is, the information analysis unit 132 performs statistical malfunction analysis, a mean time between failure (MTBF) analysis, reliability analysis, availability analysis, and maintainability analysis of each part/accessory constituting an entire apparatus and target apparatuses 40, or a predetermined analysis in response to a request from a service center and a customer. The display configuration assigning unit 133 assigns a display configuration of the analysis result from the information analysis unit 132. Then, the display configuration assigning unit 133 transfers the analysis result with the assigned display configuration to the display device 14 or to the external display device 20 through the communicating device 15.

The malfunction data analysis device 13 can request to analyze a predetermined target apparatus 14 through a communication network, and receive the result of the analysis in real time.

FIG. 4 is a diagram illustrating a display device of a fault management system in accordance with an embodiment of the present invention.

Referring to FIG. 4, wherein the display device 14 of the fault management system 10 includes a state display window 141 and a result display window 142. The state display window 141 displays the malfunction state of a predetermined apparatus 40, including an ID, a performance state, a malfunction state, a malfunction specification, a malfunction type denoting one of entire malfunction or partial malfunction, a malfunction level, a malfunctioning part and a current malfunction condition thereof. The result display window 142 displays the fault analysis result which is analyzed through the statistical analysis tool and the RAMS analysis tool. However, the present invention is not limited thereby. The display device 14 may be modified by requests from a user or a customer.

The display device 14 receives a control signal from the malfunction data analysis device 13 and the control device 12, and provides a graphical user interface (GUI) to a user or a manager for user's convenience or system automation if corresponding functions thereof can be displayed. Therefore, the display device 14 maximizes the convenience of connecting the user or the manager and the fault management system.

Figure 5:
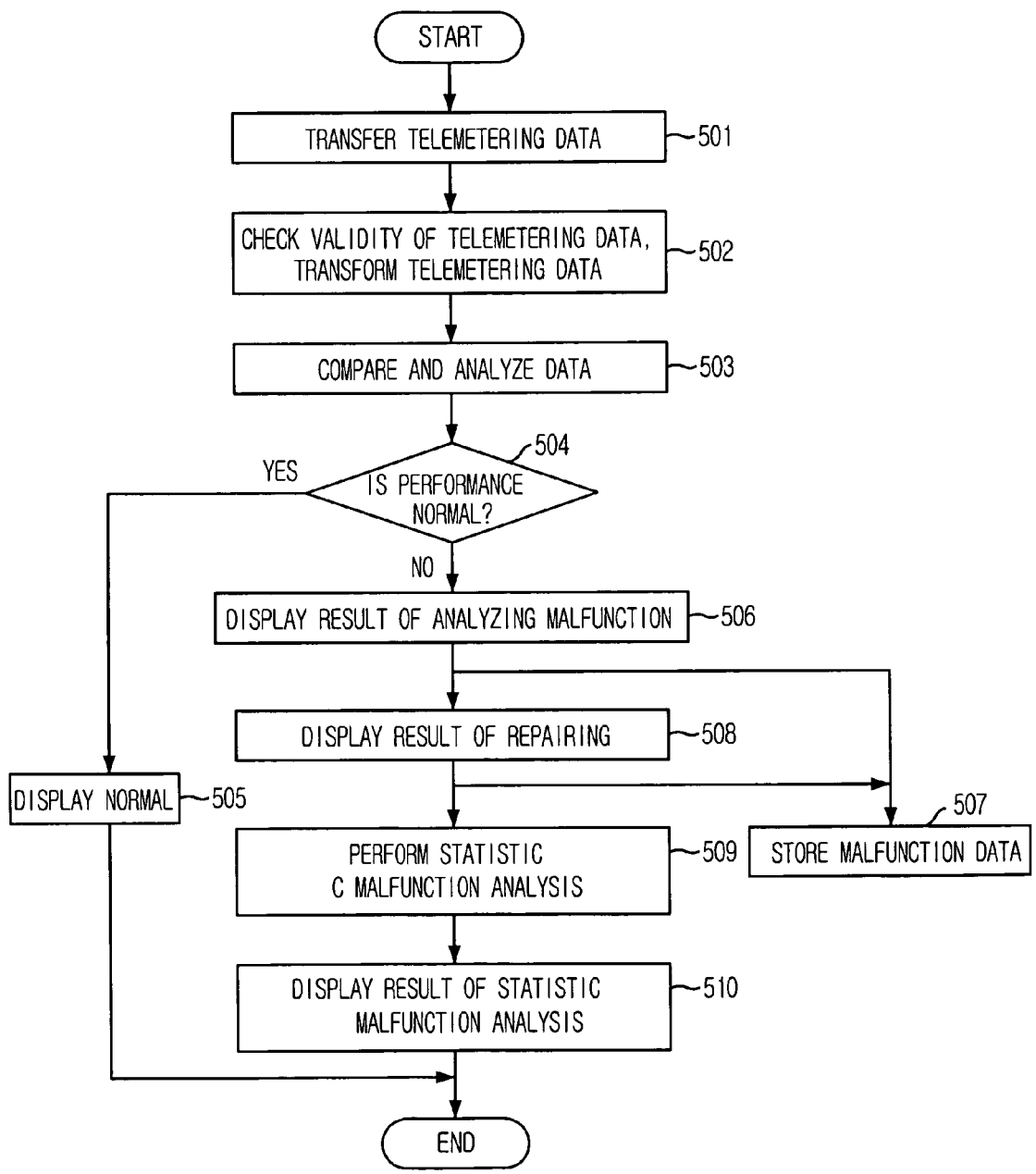
FIG. 5 is a flowchart illustrating a method of fault management using telemetering technology in accordance with an embodiment of the present invention.

FIG. 5 is a flowchart illustrating a method of fault management using telemetering technology in accordance with an embodiment of the present invention.

At step S501, the telemetering sensing device 11 of the fault management system 10 senses whether a predetermined apparatus 40 is in normal state or abnormal state based on telemetering data received from each apparatus 40 through the satellite 300 in real time, and transfers the telemetering data to the control device 12.

Then, the data examining unit 121 of the control device 12 receives the telemetering data from the telemetering sensing device 11, and examines the validity thereof. Then, the data examining unit 121 transforms the received telemetering data into data format that can express the states of parts/accessories in each of apparatuses 40 or the apparatuses 40 at step S502. Then, the data comparison and analysis unit 122 of the control device 12 analyzes the transformed performance state of each part/accessory by comparing the transformed performance state of each part/accessory with the previously stored unique assigned value such as unique performance request value of each part and accessory of each apparatus 40 at step S503.

The data determining unit 123 of the control device 12 determines whether each apparatus 40 is in a normal state or an abnormal state and determines whether each part or accessory in each apparatus 40 is in a normal state or an abnormal state based on the comparison/analysis result from the data comparison/analysis unit 122 at step S504.

If the apparatus 40 and the part and accessory thereof are in the normal state at step S504, the data determining unit 123 of the control device 12 assigns a display configuration and outputs the normal state information of the apparatus 40 through the display device 14 or the external display device 20 based on the assigned display configuration at step S505. If the apparatus 40 and the part and accessory thereof are in the abnormal state, that is, a malfunction state, at step S504, the data determining unit 123 of the control device 12 assigns a display configuration, and outputs the malfunction state of a predetermined apparatus 40, including an ID, a performance state, a malfunction state, a malfunction specification, a malfunction type denoting one of entire malfunction or partial malfunction, a malfunction level, a malfunctioning part and a current malfunction condition thereof through the display device 14 or the external display device 20 in real time at step S506. Such a malfunction state information and telemetering data from the telemetering sensing device 11 are transformed to malfunction data format and stored in the fault management database 124 at step S507.

The data examining unit 121 of the control device 12 receives a result of repairing the malfunctions of each apparatus 40 from a person that repairs the apparatus 40. At this time, the data examining unit 121 displays the result of repairing such as the ID of apparatus 40, a time of spending repairing, the detail of repairing, and the state information of testing operation on the display device 14 or the external display device 20 at step S508, and it is stored in the fault management database 124 at step S507.

Finally, the malfunction data analysis device 14 performs a statistical malfunction analysis on the malfunction data stored in the fault management system 124 using the statistical malfunction analysis tool or the RAMS analysis tool at step S509, and outputs the result thereof on the display device 14 or the external display device 20 at step S210.

According to the certain embodiments of the present invention, apparatuses installed and driven at a remote location or an unattended location are checked and managed through collecting information about the malfunction state of the apparatus and the malfunctioning parts of the apparatus in real time through a satellite. Therefore, the apparatuses can be rapidly repaired. Also, data related to the malfunction of the apparatus is stored into the database, and the proper amount of parts and accessories can be prepared through the statistical malfunction analysis using the stored malfunction data. Furthermore, information to define knowledge bases maintenance policy for effectively utilizing man power for maintenance can be provided in real time or in response to a request. Therefore, the apparatuses installed at the remote location or the unattended location can be economically or effectively managed with high reliability.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. KR 2005-0116155 and 2006-0083137, filed with the Korean patent office on Dec. 1, 2005, and Aug. 30, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A remote fault management system comprising:
   a telemetering sensing device for collecting telemetering data from target apparatuses, which are installed at a remote location and an unattended location and managed through a satellite, in real time and sensing a malfunction of the target apparatuses based on the collected telemetering data;
   a control device for determining whether the target apparatuses are malfunctioned or not by comparing the telemetering data with unique performance request values for normally driving the target apparatuses, analyzing causes of malfunctions, and storing malfunction data;
   a malfunction data analysis device for managing the stored malfunction data and analyzing the malfunction data; and
   a display device for outputting an analysis result on an external display device,
   wherein the malfunction data analysis device includes:
   a malfunction data transform unit for transforming the stored malfunction data into a transformed data format;
   a statistical malfunction analysis tool and a Reliability, Availability, Maintainability and Susceptibility (RAMS) analysis tool configured to receive the transformed data from the malfunction data transform unit;
   an information analysis unit for analyzing the transformed data using the statistical malfunction analysis tool and the RAMS analysis tool by performing statistical malfunction analysis, a mean time between failure (MTBF) analysis, reliability analysis, availability analysis, and maintainability analysis of each part/accessory constituting an entire apparatus and the target apparatuses, or performing a predetermined analysis in response to an external request; and
   a display configuration assigning unit for assigning a display configuration to display the analysis result and outputting the analysis result on the display device based on the assigned display configuration.

2. The remote fault management system as recited in claim 1, further comprising: a communicating device for enabling the result of analyzing the malfunction data on the external display device.

3. The remote fault management system as recited in claim 1, wherein the telemetering sensing device supports bidirectional interactive communication in order to check whether the target apparatus is in a normal state or an abnormal state through the satellite by a request from a manager.

4. The remote fault management system as recited in claim 3, wherein the control device includes:
   a data examining unit for examining a validity of the telemetering data received from the telemetering sensing means in real time, and transforming the received telemetering data into performance state data having a data format that denotes a performance state of the target apparatuses;
   a data comparison/analysis unit for analyzing the performance state data of the target apparatus by comparing the performance state data of the target apparatuses with previously-stored unique assigned values of each elements of each target apparatus;
   a data determining unit for determining whether performance of each target apparatus or each element in the target apparatus is in a normal state or an abnormal state based on comparing/analyzing result output from the data comparison/analysis unit, transferring information about overall malfunction state or partial malfunction state of the part/accessory of the target apparatus with position information of the target apparatus to the display device; and
   a malfunction data storing unit for receiving the information about overall malfunction state or partial malfunction state of the part/accessory of the target apparatus and for receiving the telemetering data from the telemetering sensing device, transforming the received information and the telemetering data to malfunction data in real time, and storing the malfunction data.

5. The remote fault management system as recited in claim 4, wherein the control device is an on-board computer that multi-processes the telemetering data from the telemetering sensing device and flexibly manages the telemetering data according to functional expansion of the target apparatus including adding and modifying functions of the target apparatus.

6. The remote fault management system as recited in claim 1, wherein the display device outputs the result of determining whether the performance of the target apparatus is in a normal state or an abnormal state transferred from the control device on the external display device, and outputs the result of analyzing the malfunction data transferred from the malfunction data analysis device.

7. The remote fault management system as recited in claim 6, wherein a graphic user interface (GUI) is provided to a manager.

8. The remote fault management system as recited in claim 1, wherein the telemetering data includes position information of the target apparatus, an identification number of each part/accessory, a performance state and malfunction state of each element, and a state of transmission path to the target apparatuses.

9. A remote fault management method comprising:
   collecting telemetering data from target apparatuses, which are installed at a remote location and an unattended location and managed through a satellite, in real time, and sensing whether the target apparatuses are malfunctioned or not based on the collected telemetering data;

determining whether the target apparatuses are malfunctioned or not by comparing the telemetering data with unique performance request values for normally driving the target apparatuses, analyzing causes of malfunctions, and storing malfunction data;

managing the stored malfunction data and analyzing the malfunction data; and outputting the result of performing statistical malfunction analysis on the stored malfunction data, wherein the managing of the stored malfunction data and analyzing of the malfunction data includes:

transforming the stored malfunction data into a data format used as an input to a statistical malfunction analysis tool and a Reliability, Availability, Maintainability and Susceptibility (RAMS) analysis tool;

analyzing transformed data using the statistical malfunction analysis tool and the RAMS analysis tool by performing statistical malfunction analysis, a mean time between failure (MTBF) analysis, reliability analysis, availability analysis, and maintainability analysis of each element constituting an entire apparatus and the target apparatuses, or performing a predetermined analysis in response to an external request; and assigning a display configuration and displaying the analysis result based on the assigned display configuration.

10. The remote fault management method as recited in claim 9, wherein the telemetering data includes position information of the target apparatus, an identification number of each element, a performance state and a malfunction state of each element, and a state of transmission path to the target apparatuses.

* * * * *